Dec. 17, 1963          H. KRÖPFL          3,114,471
DETACHABLY SEALED CLOSURE FOR SEPARATING TWO FLUID
              MEDIA, PARTICULARLY IN A NUCLEAR REACTOR
Filed June 17, 1960                              3 Sheets-Sheet 1

FIG. 4a    FIG. 4b    FIG. 7
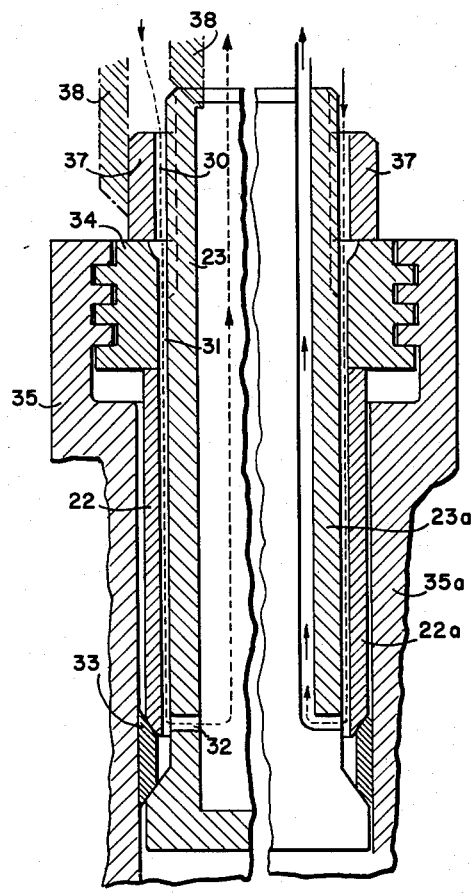
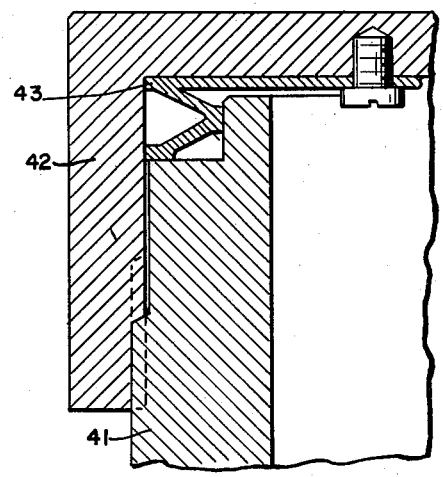
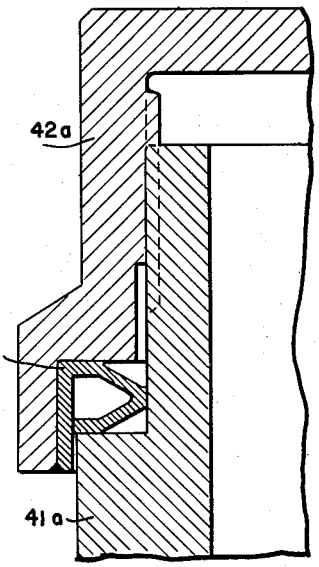
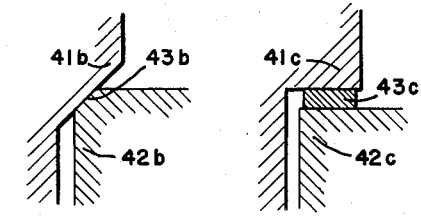
FIG. 9a    FIG. 9b    FIG. 8

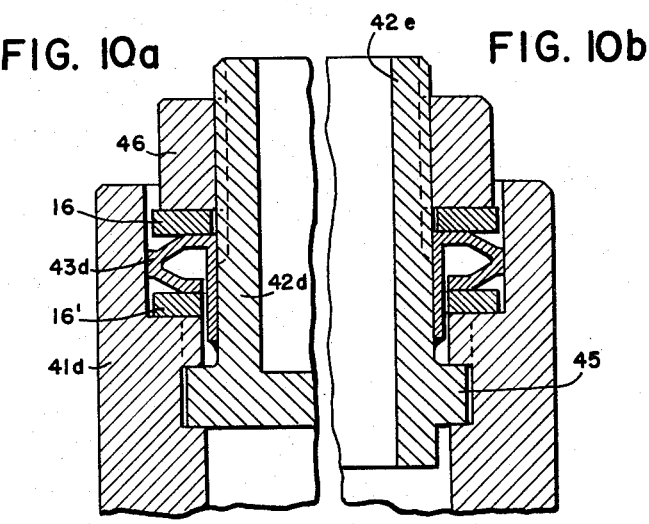
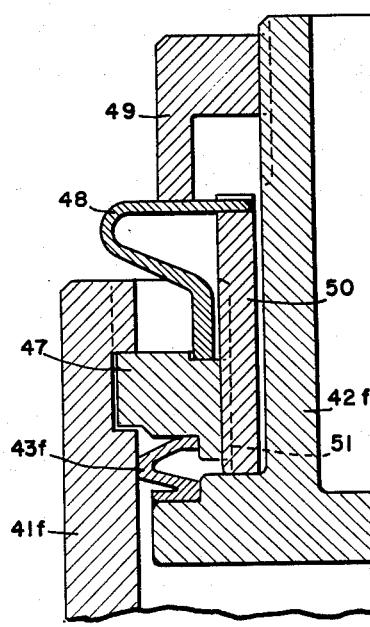
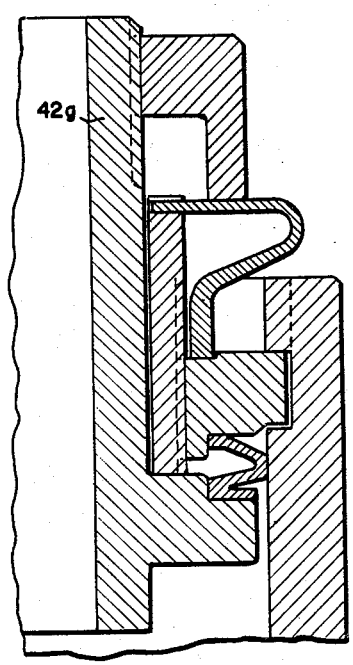

United States Patent Office 3,114,471
Patented Dec. 17, 1963

3,114,471
DETACHABLY SEALED CLOSURE FOR SEPARATING TWO FLUID MEDIA, PARTICULARLY IN A NUCLEAR REACTOR
Hans Kröpfl, Erlangen, Germany, assignor to Siemens-Schuckertwerke Aktiengesellschaft, Erlangen, Germany, a corporation of Germany
Filed June 17, 1960, Ser. No. 36,965
Claims priority, application Germany June 23, 1959
4 Claims. (Cl. 220—55)

My invention relates to detachably sealed closures for separating two fluid media, and particularly to closure devices in partitions or hollow bodies, for example nuclear reactor tanks or other vessels or conduits, that are to be reliably sealed and tight when subjected to high temperature and pressure.

The known closure constructions of this type constitute mechanisms in which the closing and sealing forces are applied externally, for example by means of a screw thread between the closure member proper and the seat thereof. Thus, it is known to effect pressure sealing by means of a metallic ring or gasket which is elastically pressed against a seating surface with the aid of a conical pressure piece. This metallic ring becomes stressed in the range of its elastic deformation or already in the range of permanent deformation. Such deformation requires the exertion of considerable forces so that the force-transmitting spindle or screw member must possess certain minimum dimensions. For that reason, the actuation of such or similar closure devices involves increasing difficulties with decreasing seal diameters. In many cases the known closure devices of this type can be used only once, requiring each time the insertion of a new component, such as a gasket ring, whenever the seal has been detached or loosened.

It is an object of my invention to provide a detachably sealed closure for an opening in a wall, such as a partition, vessel, conduit, tube or the like, in which the mechanical force to be exerted for securely tightening the seal is greatly reduced and thus remains moderate even if the diameter of the closure is made very small. Another, conjoint object of the invention is to produce the tightening and sealing forces in the closure structure by means of internal, thermal stresses so directed that the area pressure at the sealing location is increased at the normal operating temperature of the device by thermal tension between the detachable closure member and the wall or other structure in which it is seated. Still another object of the invention is to provide a detachably sealed closure of the above-mentioned type that is particularly suitable for use in nuclear reactors.

According to my invention, the property of metals to increase their length with increasing temperature, and to exhibit this effect to a different extent in respectively different materials, is taken advantage of for increasing the tightening pressure at the sealing location. This will be more fully described in the following with reference to the embodiments illustrated on the drawings in which:

FIG. 4a illustrates, also in longitudinal section, a further embodiment, and FIG. 4b shows a modification thereof.

Figure 1:
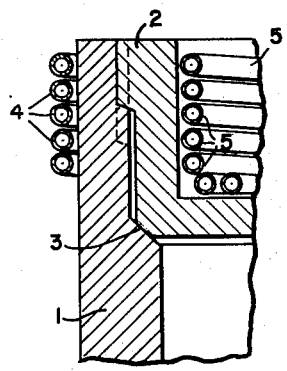
FIG. 1 is a longitudinally sectional view through one-half portion of a tubular body or vessel sealed by means of a closure according to the invention.

FIGS. 5, 6, 7, 8, 9a, and 9b show different details respectively, applicable in closures otherwise similar to those shown in the other figures.

FIG. 10a is a longitudinal section of still another closure, and FIG. 10b shows a modification thereof.

FIGS. 11a and 11b illustrate in longitudinal section two other designs of closure structures.

All illustrated embodiments have in common that the two parts to be joined and sealed with each other are mechanically interconnected by a bayonet or screw-like junction which as such is not capable of providing a sufficiently pressure-tight seal but which mainly serves as an abutment for the pressures that are produced or augmented at the sealing location by thermal tension. Two main groups of such thermally controllable closures can be distinguished:

(1) Closures in which the two components consist of materials having the same or substantially the same coefficient of thermal expansion; and (2) Closures whose two components consist of materials having distinctly different coefficients of thermal expansion.

In the first case, the closing and sealing operation proper must be preceded by a thermal treatment of at least one of the two components to be joined and sealed with each other. That is, one of the components must first be heated or cooled relative to the other. During temperature equalization, after the two components are properly assembled, one of the two interengaging components becomes expanded or contracted whereby an extremely good area pressure at the sealing location is produced. The loosening of such a sealing junction can be facilitated by again treating the corresponding components thermally, namely by either heating or cooling one of them relative to the other, so that the area pressure, opposed to loosening of the tight seal, becomes reduced. As long as the structural components forming the sealed junction possess approximately the same temperature during normal operation, which can be secured by suitable construction or expedients, the closure will retain its tight sealing ability independently of the particular temperatures encountered.

The above-mentioned thermal sealing functions can be further augmented by using materials having appreciably different coefficients of thermal expansion. A thermal pretreatment, however, can be dispensed with if such a closure junction need attain its maximum tightness only at elevated or reduced operating temperatures compared with the temperature prevailing when the joint and closure is being assembled. Such a sealing closure can readily be loosened and detached at normal room temperature (20° C.) when the device is not in normal operation, but can be loosened at the normal operating temperature only by applying the proper artificial cooling or heating of one of the closure components.

According to another feature of my invention, therefore, the closure components are designed so that heating or cooling devices can readily be put into thermally effective contact with one or the other component, such as by the insertion of electric heaters, gas burners or the like. For the same purpose one or both components of the closure member may also be provided with channels or bores through which a heating or cooling medium can be passed.

The structural features and operating principles just explained will become more fully apparent from the illustrated devices in which they are embodied.

According to FIG. 1, a removable closure member 2 in form of a cup-shaped plug has a threaded portion in engagement with a tubular portion 1 of a vessel in order to tighten and seal the vessel opening at an annular, conical sealing surface 3. Before screwing the closure member 2 into the opening, the adjacent portion of the container 1 is heated by means of a heater coil 4 and expands in axial direction. Thereafter the closure member 2 is screwed into the opening until the respective sealing faces are tightly placed against each other. Then the outer member 1 of the closure structure is permitted to cool and contracts to its original axial length. As a result, the closure plug 2 is pressed through the screw thread against the sealing seat so as to form an absolutely tight and pressure resistant seal. Due to the internal tension thus prevailing in the structure, a loosening of the closure is extremely difficult. It is therefore preferable to provide the closure member 2 with a built-in cooling coil 5 which permits cooling the member when a loosening is desired. The cooling causes the member 2 to contract thus reducing the area pressure at the sealing location.

In a closure device according to FIG. 1 the closure member 2 can be made of a material having a greater coefficient of thermal expansion than the closure structure 1 in which it is seated. In this case, the closure is self-sealing at the elevated operating temperature of the device. For this purpose the vessel portion 1 may consist of a low expansion alloy, such as ferritic steel, or the steels known in the trade as Invar Steel, or Zinkaloy. The closure member 2 in this case may consist of austenitic steel. It will be understood that the materials for components 1 and 2 must be exchanged if a greater thermal expansion of component 1, rather than component 2, is desired.

Figure 2:
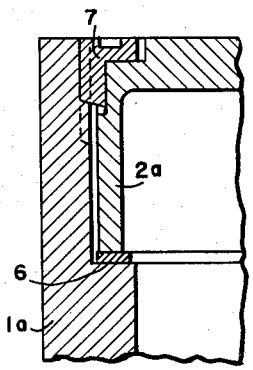
FIG. 2 is a similar sectional view of another embodiment of such a closure.

The closure device shown in FIG. 2 is similar to that of FIG. 1 and involves the same thermal requirements for closing and opening as explained above. In distinction from the embodiment of FIG. 1, the two closure components 1a and 2a do not engage each other directly for providing the seal. The seal is rather obtained with the aid of an inserted sealing ring 6 which is pressed against an annular shoulder of component 1a by the thermal expansion of the cup-shaped closure member 2a.

The sealing ring 6 preferably consists of acid-resisting or stainless steel as available under the trade designation AISI 304, the same material being applicable for the sealing rings shown in FIGS. 3a, 4a, 4b, 5 to 8, 9b, and 10a and 11b.

It is preferable to provide the device with a holder ring 7 which is exteriorly threaded and in screw engagement with the threaded opening of component 1a, and which has an annular portion in engagement with a shoulder of closure member 2a. When assembling the closure device, the ring 7 is screwed into the opening of member 1a and forces the closure member 2a against the sealing ring 6. In this manner, it is avoided that a rotational motion and stress occurs at the sealing ring 6 when the closure components are screwed together.

Figures 3A, 3B:
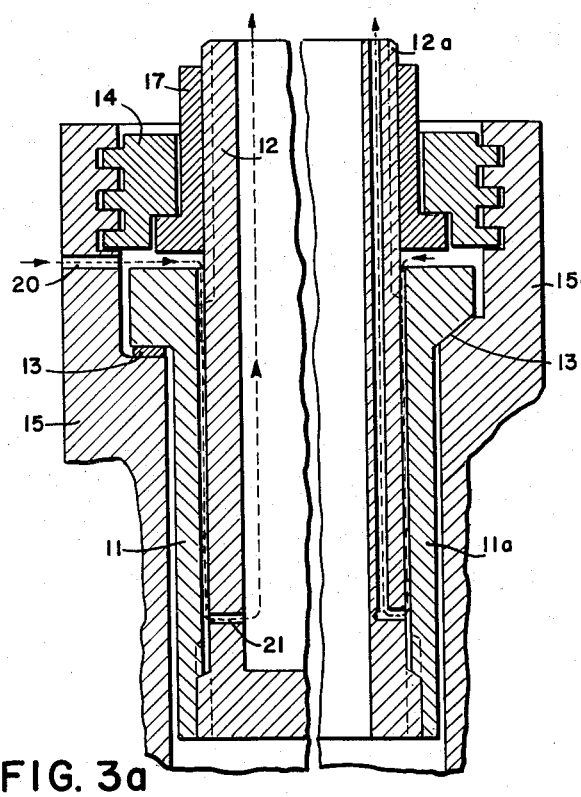
FIG. 3a shows in longitudinal section still another embodiment.
FIG. 3b illustrates a modification thereof.

FIGS. 3a and 3b show two examples of a detachable closure with built-in cooling or heating channels. The seal is effected either by direct engagement of conical sealing faces 13a (FIG. 3b) on two metal bodies as in the case of FIG. 1, or indirectly by means of an inserted sealing ring 13 (FIG. 3a) similar to the one shown in FIG. 2. Depending upon the desired sealing force, the components that are to become active by thermal expansion must possess a corresponding length and for that reason protrude into the interior of the vessel to be closed and sealed. The removable closure member 12 or 12a in both embodiments consists of a metal having greater thermal expansion than the component 11 or 11a.

The closing and sealing operation will be described with reference to the embodiment of FIG. 3a. The closure member 12 has its bottom portion in threaded engagement and firmly joined with a tubular sealing member 11. The assembly of parts 12 and 11 is inserted into the container portion 15 so that it is seated on the sealing gasket 13. Thereafter a threaded sleeve 17 is screwed over the correspondingly threaded top portion of part 12 until a ring-shaped bayonet-type locking piece 14 can be placed into engagement with corresponding annular grooves in the opening of the container portion 15. Thereafter the threaded sleeve 17 is screwed back outwardly until some amount of sealing pressure is exerted upon the sealing gasket 13 and the adjacent sealing faces. When thereafter the container is put to its normal operation and assumes a high temperature, the closure component 12 becomes axially elongated and thereby increases the sealing pressure upon gasket 13 while the bayonet engagement of ring member 14 acts as a counter abutment. If a reliable seal is to be effective before the container has reached its operational high temperature, the heating medium can be passed through the channels 20 and 21 along the path indicated by a broken line, the heating being maintained until the container reaches its high operating temperature. As a result, the required longitudinal expansion of component 2 is "artificially" maintained until the heating of the container during its operation becomes sufficient to produce or maintain the required sealing pressure.

Since an annular gap exists between components 11 and 12, there is also the possibility, when making the components of thermally the same materials, to heat the component 11 prior to inserting the closure member so that it will expand in this manner. Then, during subsequent cooling down to the normal operating temperature, the same sealing effect is achieved. In this case the closure device can be loosened and opened by cooling the inner space of the closure member 12a which then becomes shortened and relieves the area pressure at the sealing location.

The device according to FIG. 3b is substantially similar to that of FIG. 3a, except for the above-mentioned different construction of the metallic, conical sealing faces at 13a between the closure member 11a and the closure member 15a.

The embodiment shown in FIG. 4a, and the modification thereof shown in FIG. 4b are structurally similar to the devices described above with reference to FIGS. 4a and 4b, except that the thermally produced or augmented sealing pressure is not in the axial but in the radial direction. This sealing pressure in FIGS. 4a and 4b is produced by the cone-shaped ends of the closure components 22 and 23, or 22a and 23a resting against an intermediate sealing ring 33 with bevelled top and bottom faces. The device is provided with channels 30, 31 and 32 for cooling or heating fluids. Denoted by 34 is a bayonet-type locking ring which forms an abutment for the thermally expanding closure component 22 or 22a. The internal component 31 of the closure is moved upwardly with the aid of a threaded sleeve 37 until a moderate tightening effect is obtained at the sealing ring 3.

Relative to the thermal closure action, the device is operated in the same manner as described above with reference to FIG. 3a. The parts shown by dot-and-dash lines and denoted by 38 serve for guiding the heating or cooling medium whose path is indicated by a broken line. If the closure device according to FIG. 4a or FIG. 4b is made of thermally similar materials with respect to expansion by heat, then the assembly work can be done, for example, by first cooling the component 22 so that it is in contracted condition when being inserted into the closure assembly. Subsequently, due to temperature equalization, the component 22 will expand together with the other components of the device and thus causes the radial sealing pressure at sealing ring 33. To facilitate loosening the closure, the inner component 23 or 23a is additionally heated so that it will expand and thus relieve the additional tension at the sealing ring 33. This has the result that, after loosening the threaded sleeve 37, the bayonet locking member 34 can be opened.

While in the foregoing reference is made to an inner closure member which constitutes a plug for completely closing and opening a tank or other container or conduit, it should be understood that the inner closure member may also be designed without a top or bottom portion so that it constitutes a tubular body, this being shown in FIGS. 3b, 4b, 10, 11b. The closure and sealing junction thus affords joining two tubes or pipes together. Such a detachably sealed junction device is advantageously applicable, for example, for the guiding elements of nuclear fuel elements, namely for sealing such guiding tubes together with the reactor tank.

Figure 5:
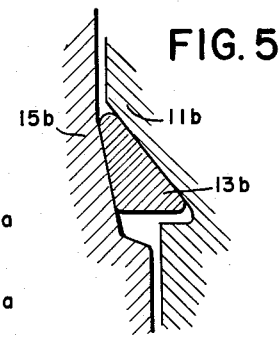
Figure 6:
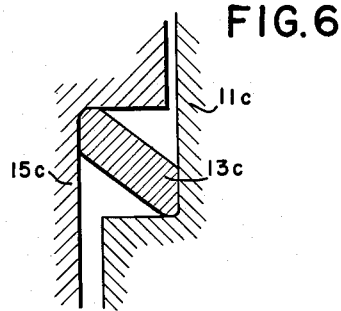

The design of the above-mentioned sealing rings 6, 13 and 33 may be modified in various ways. Thus, FIGS. 5 and 6 show special designs of sealing rings 13b and 13c which are applicable between the inner closure member 11b or 11c and the outer closure member 15b or 15c in lieu of a sealing ring as shown at 33 in FIGS. 4a and 4b.

Special designs of such sealing rings are also illustrated in FIGS. 7 to 11b. In these embodiments the sealing ring is designed as a double disc-shaped spring. By giving the angle between the two annular portions of the spring different magnitudes, a corresponding pre-adjustment of the pressure transmission ratio can be obtained. In the embodiment of FIG. 7, the outer closure member 42, before being screwed onto the inner member 41, is heated so that it will expand. In this condition the member 42 is screwed onto the member 41 until the intermediate sealing ring structure 43 becomes slightly tightened and some amount of sealing pressure is attained. During subsequent cooling of member 42, the resulting temperature equalization increases the sealing pressure and thus completes the desired pressure-type seal of the particular space to be closed and sealed. By making the component 42 of a material having a lower coefficient of thermal expansion than component 41, a complete tightening of the seal is obtained due to the heating of the hollow body structure during its normal operation.

The closure structure according to FIG. 8 is essentially similar to that of FIG. 2 with respect to the available sealing and tightening possibilities. As shown in FIG. 8, however, the sealing ring 43a of double-disc design has one end joined with the closure member 42a by welding or soldering so that only one surface need be sealed. In lieu of this particular sealing ring, while retaining the design of the other components, such other sealing possibilities as shown in FIGS. 9a and 9b can likewise be used. According to FIG. 9a, the two closure components 41b and 42b directly engage each other at a ring-shaped, conical sealing area 43b. According to FIG. 9b, a sealing gasket 43c is inserted between the closure components 41c and 42c.

In FIG. 10a, the sealing ring 8 consisting of a disc-shaped twin spring and denoted by 43d is similar to the ring 43a according to FIG. 8 in having one peripheral edge joined by welding or soldering with one of the closure components, in this case the inner component 42d. Consequently, a seal is only required relative to closure component 41d. Closure component 42d is joined with component 41d at the lower end by means of a bayonet-like engagement at 45. The sealing ring 43 is pre-tensioned by means of a nut 46 screwed onto the inner component 42d. The subsequent increase of the sealing pressure is otherwise produced in the same manner as described above, namely by pre-heating or, if materials of respectively different thermal expansion are used, by the heating to which the device is subjected in normal operation.

The modification according to FIG. 10b is identical with that described with reference to FIG. 10a, except that the inner closure member 42e is tubular rather than constituting a plug.

The described closure devices afford subjecting a sealing gap or gasket structure to very high pressures in a simple manner. These pressures, in some cases, may become so great that the closure components are plastically deformed. This can be neglected in most cases because the devices according to the invention permit readjusting the sealing seat by the screw sleeves shown at 17, 37, 42a, 46 and 49. However, in cases where it is desirable to limit the sealing pressure to a given maximum, such maximum can be secured by inserting a pressure-limiting ring-shaped spring structure as shown at 48 in FIGS. 11a and 11b.

According to FIG. 11a the expansible closure component 42f protrudes beyond the outer surface of the container structure 41f which forms the outer closure member. The device of FIG. 11a is further provided with a ring-shaped stop sleeve 50 which is joined by threaded engagement at 51 with a ring-shaped pressure piece 47. The twin-disc sealing spring 43f is located between the pressure piece 47 and a flange portion of the inner closure member 42f. After the inner closure member 42f, in heated and thermally expanded condition, is inserted into the closure structure and the appertaining threaded cap sleeve 49 is tightened against the limiting spring 48, the closure member 42f cools and thereby contracts axially. The resulting pressure, exerted upon the sealing ring 43f and also upon the pressure limiting spring member 48 produces the desired tight seal, this pressure acting between the sealing ring 43f and the outer closure member 41f in the radial direction. The stop sleeve 50 also prevents excessive spacial deformation of the sealing spring 43f. The above-mentioned pressure piece 47 is joined with the outer closure member or container portion 41f by a bayonet-like engagement thus fixing the position of the closure member 42f relative to the container. The thermal functioning of the closure device is in accordance with the principles already described. If desired, the closure member 42f may be provided with channels to permit the additional application of coolant or heating medium.

The modification according to FIG. 11b is identical with that of FIG. 11a except that the inner closure member 42g is tubularly open as is needed when the closure according to the invention is employed for tightly joining and sealing two coaxial tubes or pipes to each other.

Closure devices according to the invention may also be opened in normal operating, high-temperature condition, provided cooling is applied to the proper closure member for a short period of time. This is of advantage for nuclear reactors. For example, this principle is applicable to joining the guiding tubes for the nuclear fuel elements with the reactor tank, where the closure may serve to separate moderator fluid from coolant.

It will be understood by those skilled in the art that my invention is not limited to the embodiments particularly illustrated and described herein but that various other embodiments, for example with a square or other non-circular cross section of the closure opening, may also be designed and employed in accordance with the principles of the invention. As mentioned above, the devices are applicable not only for closing an opening in a tank or other container but also for joining and closing coaxial tubes, inlet and outlet conduits of vessels and partitions, as well as similar devices in which two metal bodies are detachably joined and sealed, one metal body having an opening in which the other is removably seated so as to form therewith a tight partition between two media.

I claim:

1. A loosenable pressure-tight sealing structure, comprising an inner and an outer metal tubular structure, mutually engageable locking means interlocking said structures, means for heating the outer structure to a temperature above that of the inner structure so as to increase the friction at said mutual engaging means and to thereby produce a pressure-tight locked joint between said structures, and means for cooling the inner structure relative to the outer structure so as to reduce the friction at said mutual engaging means for loosening the locked joint.

2. In a closure according to claim 1, said two structures consistnig of materials having different thermal coefficients of expansion respectively, said respective structures having mating concentric sealing surfaces opposite each other, the difference in thermal expansion of said respective materials providing sealing pressure at said sealing faces.

3. A loosenable pressure-tight sealing structure according to claim 1, one of said structures having an opening and the other being removably slated in said opening, said respective structures having mating concentric sealing faces opposite each other and said mutual engaging means comprising mechanical fastennig means concentric to said sealing faces and adapted to mechanically hold said two sealing faces in sealing relation to each other, said two structures under normal operating conditions being thermally stressed between said sealing faces in sealing-pressure increasing direction, at least one of said bodies having temperature control means for changing the temperature of said body and thus its dimension in the direction required to relieve the thermal stress between said sealing faces so as to permit loosening the seal for uncovering said opening.

4. In a sealing structure according to claim 3, said temperature control means comprising ducts in said body for supply of temperature-controlling fluid.

References Cited in the file of this patent

UNITED STATES PATENTS

| | | |
|---|---|---|
| 1,326,124 | Vischer | Dec. 23, 1919 |
| 1,617,451 | Kniskern | Feb. 15, 1927 |
| 2,424,449 | Gashe | July 22, 1947 |
| 2,481,478 | Petroe | Sept. 6, 1949 |
| 2,875,917 | Alkire | Mar. 3, 1959 |
| 2,940,734 | Harvey | June 14, 1960 |

FOREIGN PATENTS

| | | |
|---|---|---|
| 595,332 | France | July 13, 1925 |